June 17, 1969 J. R. COLSTON 3,450,145
ACCELEROMETER
Filed June 13, 1966
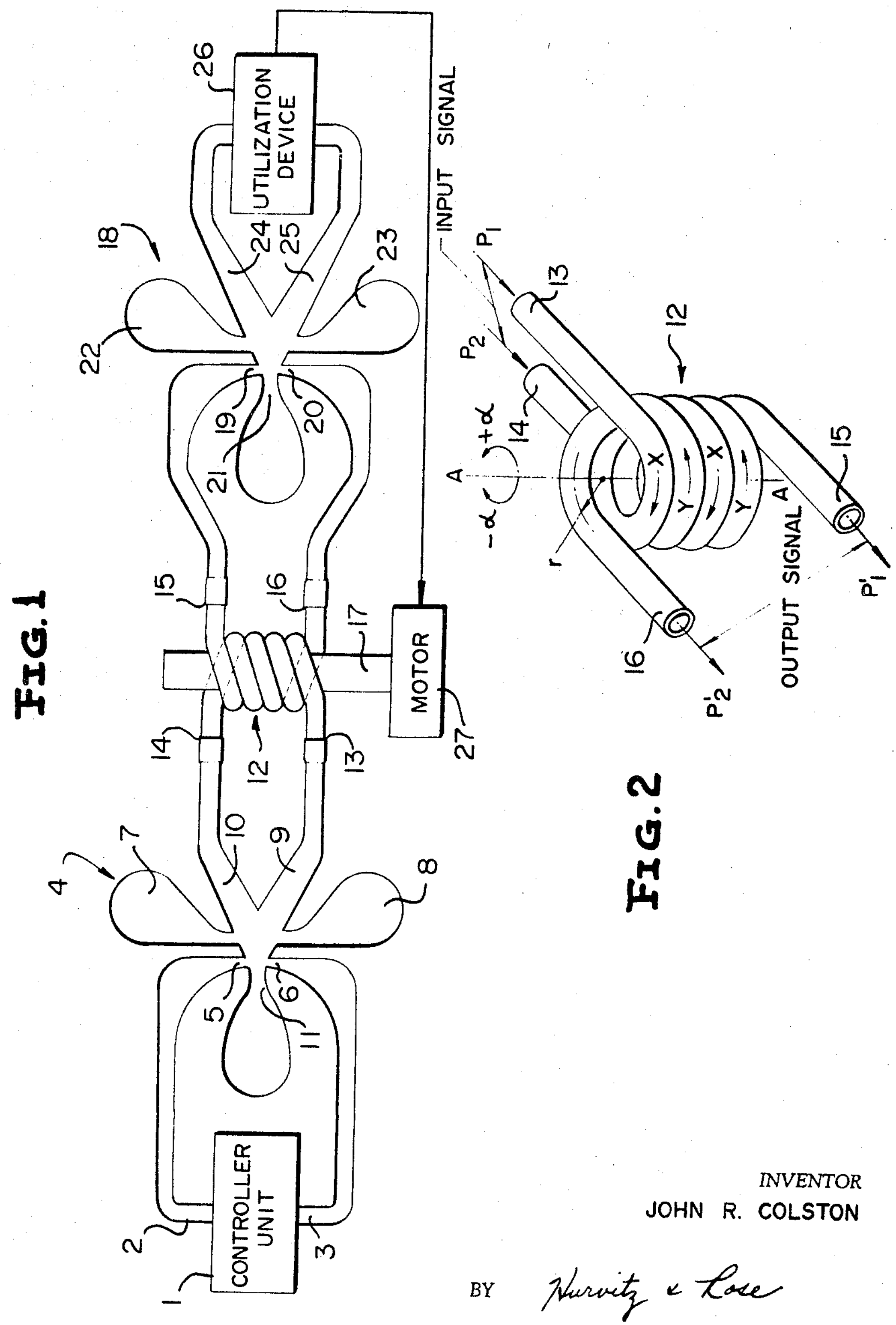
INVENTOR
JOHN R. COLSTON
BY Hurvitz & Rose
ATTORNEYS United States Patent Office 3,450,145

Patented June 17, 1969

3,450,145
ACCELEROMETER

John R. Colston, Pittsburgh, Pa., assignor to Bowles Engineering Corporation, Silver Spring, Md., a corporation of Maryland Filed June 13, 1966, Ser. No. 557,114
Int. Cl. F15c *1/08, 1/14;* G01p *15/00*
U.S. Cl. 137—81.5 8 Claims The present invention relates to fluid angular accelerometers generally, and more specifically, to a pure fluid angular accelerometer sensor inserted in a fluid control line to impart an acceleration-responsive component to a fluid control signal.

In many pneumatic and hydraulic control systems, such as steering controls, automatic pilots, and the like, there is a need to modify a control signal to correct possible undesired angular acceleration of the physical system being controlled. For example, in a hydraulic nose wheel steering system for an airplane, an angular acceleration control is necessary to prevent nose wheel shimmy, a prevalent and obviously dangerous condition. Similarly, in an automatic pilot control system, the flight control signals must reflect compensation for any tendency of the aircraft towards yaw, such compensation being expediently accomplished by adding an angular acceleration component to the control signals.

In the past, angular acceleration control in fluid systems has usually been achieved using fluid accelerometers of the valve or piston (or other mechanical movement) type. To date, pure fluid accelerometers have required complex interconnections of a multiplicity of pure fluid components, an undesirable circumstance from the point of view of cost and space.

It is an object of this invention to provide a pure fluid angular accelerometer of low cost and simple construction.

It is a further object of this invention to provide a pure fluid device readily adapted for insertion in a fluid control line for the purpose of introducing into a fluid control signal a signal component that is a function of angular acceleration.

It is still a further object of this invention to provide a simple means for superimposing a fluid signal, that is a function of angular acceleration of a member, on another fluid signal which controls said member.

Another object of this invention is to provide a simple and inexpensive means to monitor angular acceleration.

Other objects and advantages of the instant invention will be readily apparent from the detailed description which follows. In conjunction with such description, explanatory drawings of the invention are appended hereto, said drawings comprising:

FIGURE 1 a partial-block, partial-schematic diagram of a control system employing the angular accelerometer of this invention; and FIGURE 2 a perspective view of the angular accelerometer of this invention.

Referring specifically to FIGURE 1 of the accompanying drawings, there is illustrated an embodiment of a system employing the accelerometer of the present invention to modify a control signal in the form of a pressure differential produced at output ports 2 and 3 of a controller unit 1.

Controller unit 1 may be, for example, a manually operated steering mechanism, an automatic pilot flight controller, or the like. The pressure differential produced at output ports 2 and 3 is applied to control nozzles 5 and 6 respectively of a pure fluid proportional amplifier 4. Pure fluid amplifier 4, additionally comprises supply nozzle 11, chambers 7 and 8 which vent to the atmosphere, and output passages 9 and 10.

The differential pressure signal appearing at control nozzles 5 and 6 is amplified and appears in output passages 9 and 10 respectively. The amplified signal is then applied to input ends 13 and 14 of accelerometer 12, the latter being secured to a member 17. Member 17, the element which is being controlled by controller unit 1, may, for example, be the support column of a wheel which is being manually steered by an operator at the controller unit. As will be described in greater detail below, accelerometer 12 translates angular acceleration of member 17 into incremental changes in pressure. These changes are superimposed on the pressure signal applied to input ports 13 and 14, with the result that the pressure signal at the output ports 15 and 16 of the accelerometer 12 contains the initial control signal component plus an angular-acceleration control component. The combined signal is then subjected to further pressure amplification in fluid amplifier 18, said amplifier comprising power nozzle 21, control nozzles 19 and 20, atmosphere vents 22 and 23, and output passages 24 and 25. The amplified signal appearing at output passages 24 and 25 is applied to a utilization device 26 which is designed to control hydraulic motor 27. Hydraulic motor 27 controls the angular position of wheel column 17 in accordance with the pressure differential applied to utilization device 26.

Having described a system employing the angular accelerometer, the detailed structure and operation of the accelerometer itself will now be described.

In FIGURE 2, the angular accelerometer of this invention is illustrated as comprising two fluid paths 13–15 and 14–16, wound together as alternate convolutions of a toroidal structure with the coils wound in opposite senses. Specifically, coil 13–15 is wound clockwise and coil 14–16 is wound counter clockwise in FIGURE 2. The coils may be arranged to encircle a member, such as column 17 of FIGURE 1, whose angular acceleration is to be monitored. Because of this configuration the longitudinal axis of the column 17 and the central axis A–A′ of the coils coincide. A differential fluid pressure signal, $P_1-P_2$ is applied to the input ends 13, 14 of the two fluid paths 13–15 and 14–16. The differential pressure $P_1-P_2$ is indicative of a desired control condition sought to be applied to the wheel column 17 of FIGURE 1. The control signal appears at the output ends 15 and 16 of the accelerometer coils as $P_1'-P_2'$ which represents $P_1-P_2$ modified, in a manner described below, by the angular acceleration of the controlled member 17 about axis A–A′.

In operation, assume first that there is no rotation of member 17 about axis A–A′. In such a case, the input control signal remains unaffected by the accelerometer and $P_1-P_2=P_1'-P_2'$.

Assume now that the controlled element, and thus the accelerometer 12, are rotating about axis A–A′ at some constant angular velocity. When this condition subsists for a sufficient length of time, drag between the fluid and the walls of the passages 13–15 and 14–16 causes the fluid to assume the same angular velocity as the accelerometer and the only flow in the system is due to the input control signal. Thus $P_1-P_2$ is still equal to $P_1-P_2'$.

Now assume that the controlled element 17 exhibits a sudden change in angular velocity about axis A–A′, for example a velocity increase (or an acceleration) in and $+\alpha$ direction as indicated in FIGURE 2. The sudden movement of the coils causes a change in momentum of the fluid within the coils relative to the coils, in a direction opposite to that of the change in the angular velocity of the coils. Specifically, the momentum of the fluid relative to the coils increases in the $-\alpha$ direction. This change of momentum of the fluid relative to the coils manifests itself as a change in fluid pressure at the output ends 15, 16 of the coils, and thereby modifies the control signal. For example, coil acceleration in the $+\alpha$ direction causes fluid flow in path 13–15, as indicated by arrow X, to change in a manner opposite to the change experienced by the coil, and thus tends to re-enforce flow in the direction of arrow X. Each coil in path 13–15 experiences this effect, thereby increasing the pressure at 15 in accordance with the cumulative changes produced by each coil in the path 13–15. Concurrently, with the increase in velocity (or acceleration) of the accelerometer in $+\alpha$ direction, the fluid flow in path 14–16, as illustrated by arrow Y, experiences a momentum change, relative to the coils, in a direction opposite to $+\alpha$ and thus tends to impede fluid flow in the direction of arrow Y. In a manner analogous to that described above for path 13–15, the pressure $P_2'$ at 16 is decreased in accordance with the cumulative effect of the momentum changes of all coils in the path 14–16. Since the changes in $P_1'$ and $P_2'$ are in opposite directions, the cumulative effect is a net change in the differential pressure signal appearing across 15 and 16, such change being proportional to changes in angular velocity; that is, angular acceleration, of column 17 about the accelerometer axis A–A′.

By a similar analysis, it is apparent that angular acceleration in the $-\alpha$ direction produces an effect upon $P_1'-P_2'$ exactly opposite to that produced by the increase in the $+\alpha$ direction, decreasing the differential pressure across 15, 16.

If paths 13–15 and 14–16 are identical in both length and diameter, a particular angular acceleration about A–A′ produces equal but opposite pressure changes in $P_1'$ and $P_2'$.

Further, the change in pressure brought about by any angular acceleration of member 17 is directly proportional to the number of coils in both paths, to the radius of the coil from axis A–A′, and to the density of the fluid. Specifically, the differential pressure due to acceleration is expressed by Equation 1.

$$P_a=2\pi r^2\alpha\gamma n/g$$

where $r$ is the radius of the coils, $n$ is the number of coil loops, $\gamma$ is the density of the fluid and $f$ is the angular acceleration.

With respect to the system of FIGURE 1, it should be pointed out that the angular acceleration of member 17 must be considered in physically positioning fluid amplifiers 14 and 18 or their equivalents. If these amplifiers are to be positioned such that they will be subject to the same rotational motion as member 17, it is desirable for the plane of the amplifier to be parallel to the central axis A–A′ of the accelerometer. The reason for this is that the fluid flowing from the power nozzles 11 and 12 of these amplifiers is subject to displacement with respect to the amplifier output passages if there is any component of acceleration of said fluid in a direction normal to its flow. By placing the amplifier plane parallel to the accelerometer axis, no such component is possible and thus accuracy is assured. Of course, if the amplifiers are positioned so as not to be subject to the rotational motion, these limitations do not apply.

There has been described above a pure fluid angular accelerometer of simple and inexpensive structure. While only one embodiment of the accelerometer and only one system use for it have been described, it is not meant to limit the invention to this description. The many modifications and utilizations of the invention which become apparent from this description are intended to be a part of the inventive scope and spirit set forth hereinabove.

What I claim is:

1. A fluidic accelerometer comprising a pair of coaxial helical passages wound in opposite senses, means for applying a differential fluid signal to one end of each of said helical passages such that fluid flows in said passages in opposite senses, said passages being capable of rotation about their axis as a function of an angular acceleration to be sensed.

2. The combination according to claim 1 wherein said passages each comprise a plurality of equal radii turns spaced along their common axis.

3. The combination according to claim 2 wherein said turns are interleaved on a one-for-one basis.

4. The combination according to claim 3 further comprising means connected to another end of each of said passages to sense a differential signal developed across said another end of said passages.

5. The combination according to claim 4 further comprising means responsive to said means for sensing for rotating said passages in a direction opposite to the direction of angular acceleration sensed.

6. A pure fluid angular accelerometer comprising:

a first coiled fluid flow path in the shape of a toroid, comprising a fluid input and a fluid output;

a second coiled fluid flow path in the shape of a toroid, having a fluid input and a fluid output;

means for developing a fluid pressure differential between said inputs, and a resultant fluid pressure differential between said outputs;

rotatable means interconnecting said fluid paths for changing the fluid pressure differential at said fluid outputs from the fluid pressure differential applied at said fluid inputs by an amount proportional to the angular acceleration of said rotatable means.

7. The pure fluid angular accelerometer of claim 6 wherein said first and second fluid flow paths form alternate coiled layers of a common toroidal structure.

8. The pure fluid angular accelerometer of claim 7 wherein said common toroidal structure is fixedly secured and encircled about said rotatable means.

No references cited.

SAMUEL SCOTT, *Primary Examiner.*

U.S. Cl. X.R.

73—515